United States Patent
Rogers (10) Patent No.: US 11,384,887 B2
(45) Date of Patent: Jul. 12, 2022

(54) NESTED PRE-CHARGE CARTRIDGES

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 39 days.

(21) Appl. No.: 16/913,882

(22) Filed: Jun. 26, 2020

(65) Prior Publication Data
US 2020/0408347 A1    Dec. 31, 2020

Related U.S. Application Data

(60) Provisional application No. 62/867,727, filed on Jun. 27, 2019.

(51) Int. Cl.
| | |
|---|---|
| *F16L 55/054* | (2006.01) |
| *F16L 55/053* | (2006.01) |
| *F04B 11/00* | (2006.01) |
| *F04B 39/00* | (2006.01) |

(52) U.S. Cl.
CPC ........ *F16L 55/054* (2013.01); *F04B 11/0016* (2013.01); *F16L 55/053* (2013.01); *F04B 39/005* (2013.01); *F15B 2201/315* (2013.01); *F15B 2201/3152* (2013.01); *F15B 2201/3154* (2013.01); *F15B 2201/3156* (2013.01); *F15B 2201/32* (2013.01)

(58) Field of Classification Search
CPC ...... F04B 11/0016; F04B 39/005; F15B 1/16; F15B 2201/22; F15B 2201/315; F15B 2201/3152; F15B 2201/3156; F15B 2201/32

USPC ...................................................... 138/26, 30
See application file for complete search history.

(56) References Cited

U.S. PATENT DOCUMENTS

| | | | | |
|---|---|---|---|---|
| 2,290,337 | A | * | 7/1942 | Knauth .................... F16L 55/04 138/30 |
| 2,875,786 | A | * | 3/1959 | Dewitt .................... F16L 55/054 138/30 |
| 2,877,799 | A | * | 3/1959 | Hildenbrandt, Jr. ........................ G01L 19/0618 92/97 |
| 2,878,835 | A | * | 3/1959 | Peterson ............... F16L 55/054 138/30 |

(Continued)

FOREIGN PATENT DOCUMENTS

GB      1197524 A * 7/1970 ............. F15B 1/086

OTHER PUBLICATIONS

International Search Report and Written Opinion of the International Searching Authority in connection with International Application No. PCT/US2020/039950 dated Sep. 10, 2020, 8 pages.

*Primary Examiner* — Robert K Arundale
*Assistant Examiner* — Richard K. Durden (57) ABSTRACT

A nested gas charged cartridge for insertion in a cylinder to reduce pulsations in a fluid pumping system includes a first gas cartridge and a second gas cartridge, and optionally a third gas cartridge. Each of the first, second, and third gas cartridges independently and cumulatively reduce pulsations entering the cylinder. A diameter of the third gas cartridge is less than a diameter of the second gas cartridge, which both are less than a diameter of a first gas cartridge.

20 Claims, 10 Drawing Sheets

(56) References Cited

U.S. PATENT DOCUMENTS

| | | | | |
|---|---|---|---|---|
| 3,063,470 | A | | 11/1962 | Forster |
| 3,454,191 | A | * | 7/1969 | Mercier ............... F15B 1/12 |
| | | | | 220/582 |
| 3,461,914 | A | * | 8/1969 | Nobuyuki ............. F15B 1/10 |
| | | | | 138/30 |
| 3,536,102 | A | * | 10/1970 | Abduz ............... F16L 55/052 |
| | | | | 138/30 |
| 3,766,992 | A | * | 10/1973 | Tiraspolsky ........... E21B 17/04 |
| | | | | 175/25 |
| 3,941,032 | A | * | 3/1976 | Clerk ............... F01B 3/0055 |
| | | | | 91/6.5 |
| 4,497,388 | A | | 2/1985 | Dexter |
| 4,897,906 | A | * | 2/1990 | Bartholomew ........ F16L 55/05 |
| | | | | 138/26 |
| 5,709,248 | A | * | 1/1998 | Goloff ............... F16L 55/05 |
| | | | | 138/28 |
| 5,860,452 | A | | 1/1999 | Ellis |
| 2011/0079140 | A1 | * | 4/2011 | Baseley ............. F15B 1/26 |
| | | | | 92/90 |
| 2013/0247751 | A1 | * | 9/2013 | Baseley ............. F15B 1/04 |
| | | | | 92/90 |
| 2016/0223118 | A1 | | 8/2016 | Pestunov |
| 2019/0390813 | A1 | * | 12/2019 | Rogers ............. F04B 11/0016 |

\* cited by examiner

NESTED PRE-CHARGE CARTRIDGES

CROSS-REFERENCE TO RELATED APPLICATION AND CLAIM OF PRIORITY

This application claims priority under 35 U.S.C. § 119(e) to U.S. Provisional Patent Application No. 62/867,727 filed on Jun. 27, 2019. The above-identified provisional patent application is hereby incorporated by reference in its entirety.

TECHNICAL FIELD

This disclosure relates generally to the operation of reciprocating pump fluid transfer systems. More specifically, this disclosure relates to pulsation control products with nested pre-charge cartridges.

BACKGROUND

Pulsation control in reciprocating pump fluid transfer systems is in constant need of improvement. Among the desirable improvements are reduced pulsation amplitudes to the pumps and from pumps to the downstream system as well as greater flexibility in integration of pulsation control dampeners with other elements of an overall pump system.

SUMMARY

This disclosure provides nested pre-charge cartridges for pulsation control products or with a suction stabilizer.

In one embodiment, a nested gas charged cartridge for insertion in a cylinder to reduce pulsations in a system is provided. The nested gas charged cartridge including a first gas cartridge, a second gas cartridge, and a third gas cartridge. Each of the first, second, and third gas cartridges independently and cumulatively reduce pulsations entering the cylinder. A diameter of the third gas cartridge is less than a diameter of the second gas cartridge, which both are less than a diameter of a first gas cartridge.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. The terms dampener and stabilizer may be used interchangeably. The terms pulsation dampener, dampeners, suction dampener, suction stabilizer, or stabilizers may be used interchangeably.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged piping manifold dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks, as well as the magnitude of pressure pulsations within the pumped fluid, hasten the deterioration of the pump, the pump's fluid end expendable parts, and equipment downstream from the pump, such as measurement equipment used to determine drilling parameters. Failure to control such pressure peaks and the magnitude of the pulsation inevitably affects the operating performance and operational life of the pump, pump fluid end expendable parts, and all upstream or downstream components. Pressure peaks and magnitude of the pressure pulsations may also interfere with instrument signal detection, such that failure to control pressure peaks and magnitude of the pressure pulsations may also affect the signal detection and/or quality of the signal detection in, for example, measurement during drilling operations.

Pressure pulsations are the sudden change in pressure within a closed system when fluid velocities increase and decrease in a constant friction piping system, resulting in pressure changes. For example, the acceleration or deceleration of the fluid as a result of valves opening and closing typically results in fluid pressure pulsations. Since fluid is not easily compressible, any force applied to the fluid by a pump can produce pressure pulsations. The pump produces variable energy in the fluid from its reciprocating motion and its valves opening and closing. The variations can become extreme and cause damage to upstream or downstream components depending on the location of the high variations. The variations can also cause damage, such as cavitation, inside the fluid end cylinder of the pump. Additionally, the pressure variations can be increased when the pump lacks a proper suction flow. For example, if the pump lacks a proper suction flow, as the pump's piston moves from a retracted position to a forward position, the piston can impact the fluid creating a pressure variation in the fluid.

Pulsation control equipment is typically placed immediately upstream, downstream, or both from a reciprocating pump, often with a relative size and configuration proportional to the volume of desired fluid displacement per stroke of the pump, the maximum allotted magnitude of the pressure peaks, and the magnitude of pressure pulsations that may be experienced by the pump system during each cycle. Pulsation control equipment aids in reducing pump loads and in minimizing pulsation amplitudes to the pump, to the pump's fluid end expendable parts, and to equipment upstream or downstream from the pump. As a result, pulsation control equipment improves the relative operating performance and life of the pump, the pump's fluid end expendable parts, and any equipment upstream or downstream from the pump.

Different pulsation control systems have been developed, including gas-charged devices and "charge free" devices. Common types of pulsation control devices are hydropneumatic devices, or a gas-charged pressure vessel (containing compressed air or nitrogen and a bladder or bellows that separates the process fluid from the gas charge), devices containing a compressible foam or similar material to absorb pressure pulses, or gas over liquid pulsation control products. Most commonly cylindrical or roughly spherical, pulsation control devices may be either flow-through or appendage-type devices. To optimize pulsation dampening effect, installing the pulsation control device(s) as close as possible to the pump intake or discharge is often preferable. At such locations, however, the presence of pulsation control devices may interfere with installation of other system components, such as a strainer or a cross. In addition, gas-charged pulsation control designs typically require that the gas pre-charge in the cartridge or bladder be appropriately below the normal system pressure, and that the pulsation control device be properly sized with the correct gas volume for the system operating conditions to meet a desired pulsation level performance. An undersized pulsation control device cannot adequately compensate for pressure and flow fluctuations, while an oversized device will act as an accumulator, storing too much fluid and causing slow stabilization and delayed response to system changes.

Regardless of the device type, the performance of pulsation control devices diminishes when the pressure of the drilling fluid from the pump is not within the pressure range that the device is designed to handle (e.g., too high). For example, even when a pulsation control device is installed in a drilling system, pulsations may be experienced further downstream from the pumps, since the pressure of the fluid within the pipeline is ramping-up to a pressure suitable for the drilling operation. These downstream pulsations can cause damage to the various downstream components (both equipment and sensors), increase audible noise, increase noise in sensor readings related to the drilling operation, and reduce performance of the drilling operation when the pressure of the system is not within the pressure range the pulsation control dampener is designed to handle.

Figure 1:
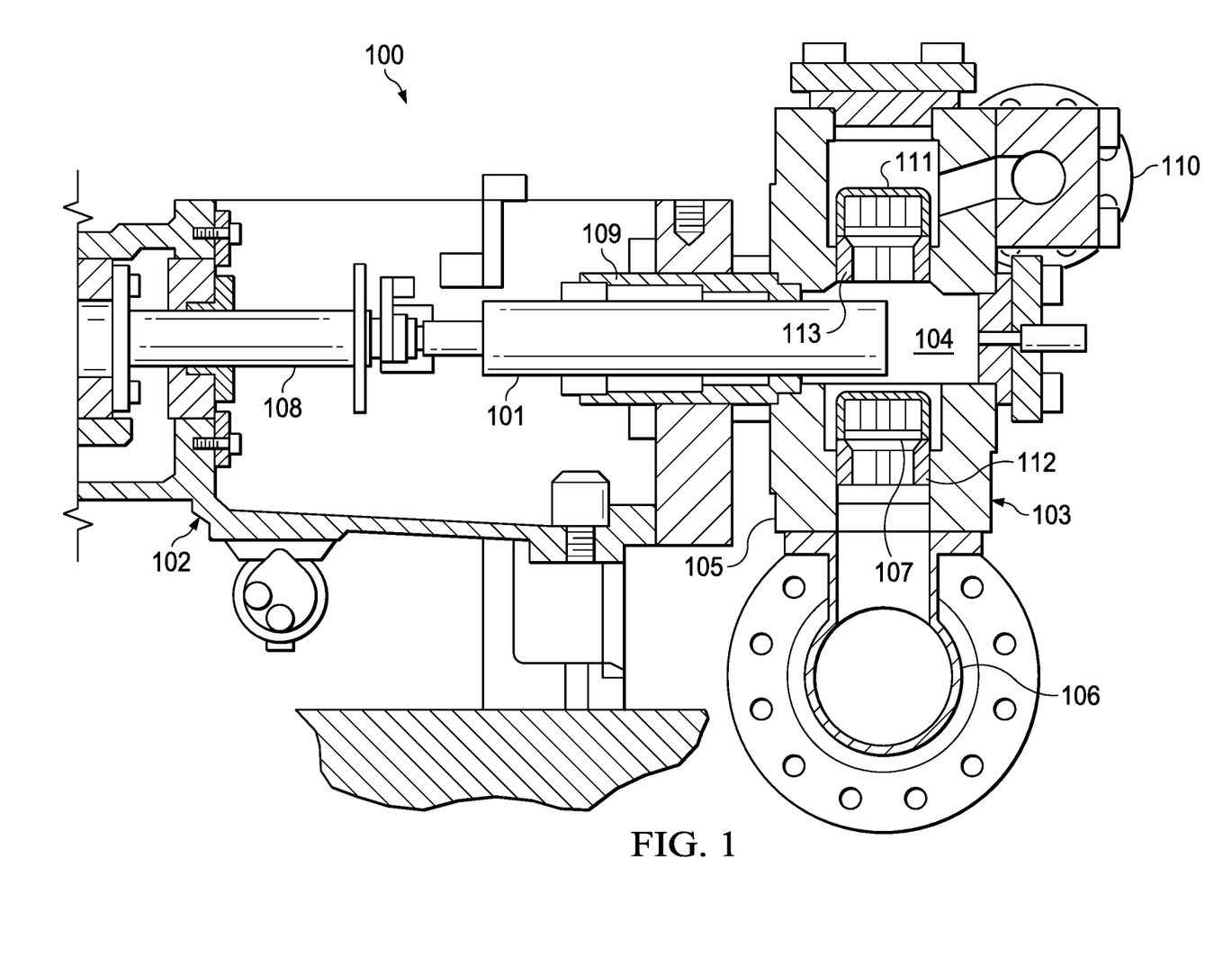
FIG. 1 illustrates a simplified cross-sectional and schematic view of a reciprocating pump system employed within pulsation control dampener system with multiple flow paths according to an embodiment of the present disclosure.

FIG. 1 illustrates a simplified cross-sectional and somewhat schematic view of a reciprocating pump system 100 employed within a pulsation control dampener system with multiple flow paths, according to an embodiment of the present disclosure. Generally, the reciprocating pump system 100 includes a pump suction and/or discharge pulsation control product including a gas-charged pulsation control dampener or a reactive pulsation control dampener according to an embodiment of the present disclosure. The reciprocating pump system 100 may employ a reciprocating pump of a type well-known and commercially available. The pump within the reciprocating pump system 100 is configured to reciprocate one or more pistons or plungers 101 (only one shown in FIG. 1). Each piston or plunger 101 is preferably connected by a suitable rotatable crankshaft (not shown) mounted in a suitable "power end" housing 102. Power end housing 102 is connected to a fluid end structure 103 configured to have a separate pumping chamber 104 for each piston or plunger 101. Pumping chamber 104 is exposed to its respective piston or plunger 101. One such pumping chamber 104 is shown in FIG. 1.

More specifically, FIG. 1 illustrates a simplified cross-sectional view through a typical pumping chamber 104. Fluid end structure 103 includes housing 105. Pumping chamber 104 receives fluid from inlet manifold 106 by way of a conventional poppet type inlet or suction valve 107 (only one shown). Piston or plunger 101, projecting at one end into pumping chamber 104, connects to a suitable crosshead mechanism, including crosshead extension member 108. Crosshead extension member 108 is operably connected to a crankshaft or eccentric (not shown) in a known manner. Piston or plunger 101 also projects through a conventional liner or through conventional packing 109, respectively. Each piston or plunger 101 is preferably configured to pumping chamber 104. Each piston or plunger 101 is also operably connected to inlet manifold 106 and discharge piping manifold 110 by way of a suitable suction valve 107 or discharge valve 111, as shown. Inlet manifold 106 can include a suction piping manifold that typically receives fluid from suction stabilizer (not shown in FIG. 1) or a suction piping with a suction stabilizer. Discharge piping manifold 110 typically discharges into a discharge dampener (not shown in FIG. 1). Valves 107 and 111 are of conventional design and typically spring biased to their respective closed positions. Valves 107 and 111 each also may include or be associated with removable valve seat members 112 and 113, respectively. Each of valves 107 and 111 may preferably have a seal member (not shown) formed thereon to provide fluid sealing when the valves are in their respective closed and seat engaging positions.

Those skilled in the art will recognize that the techniques of the present disclosure may be utilized with a wide variety of single and multi-cylinder reciprocating piston or plunger power pumps as well as possibly other types of positive displacement pumps. As one example, the number of cylinders of such pumps may vary substantially between a single cylinder and essentially any number of cylinders or separate pumping chambers. Those skilled in the art will also recognize that the complete structure and operation of a suitable pump system is not depicted or described herein. Instead, for simplicity and clarity, only so much of a pump system as is unique to the present disclosure or necessary for an understanding of the present disclosure is depicted and described.

Figure 2A:
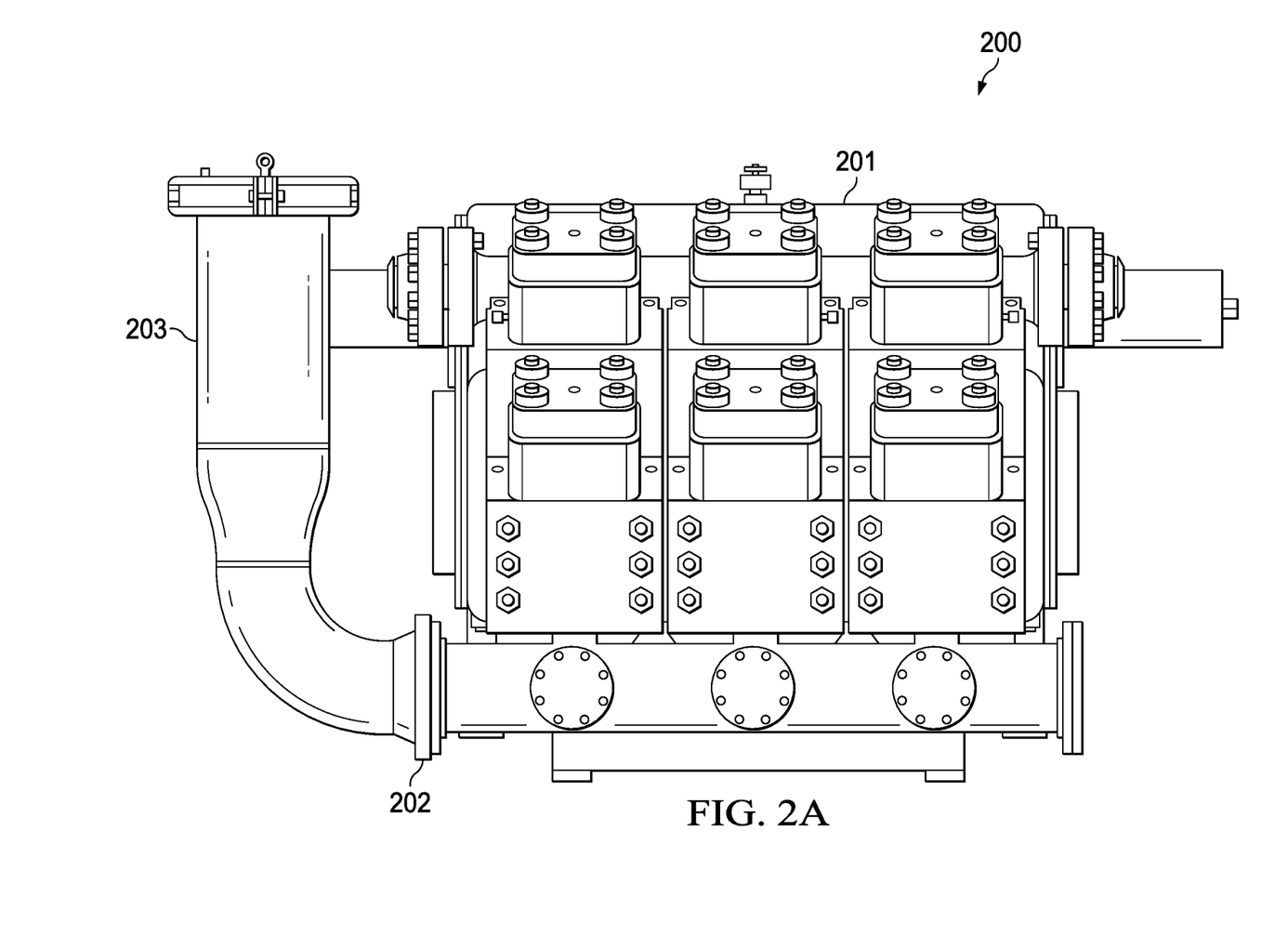
FIGS. 2A and 2B illustrate exemplary locations of a pulsation control suction stabilizer in relation to a pump according to various embodiments of the present disclosure.
Figure 2B:
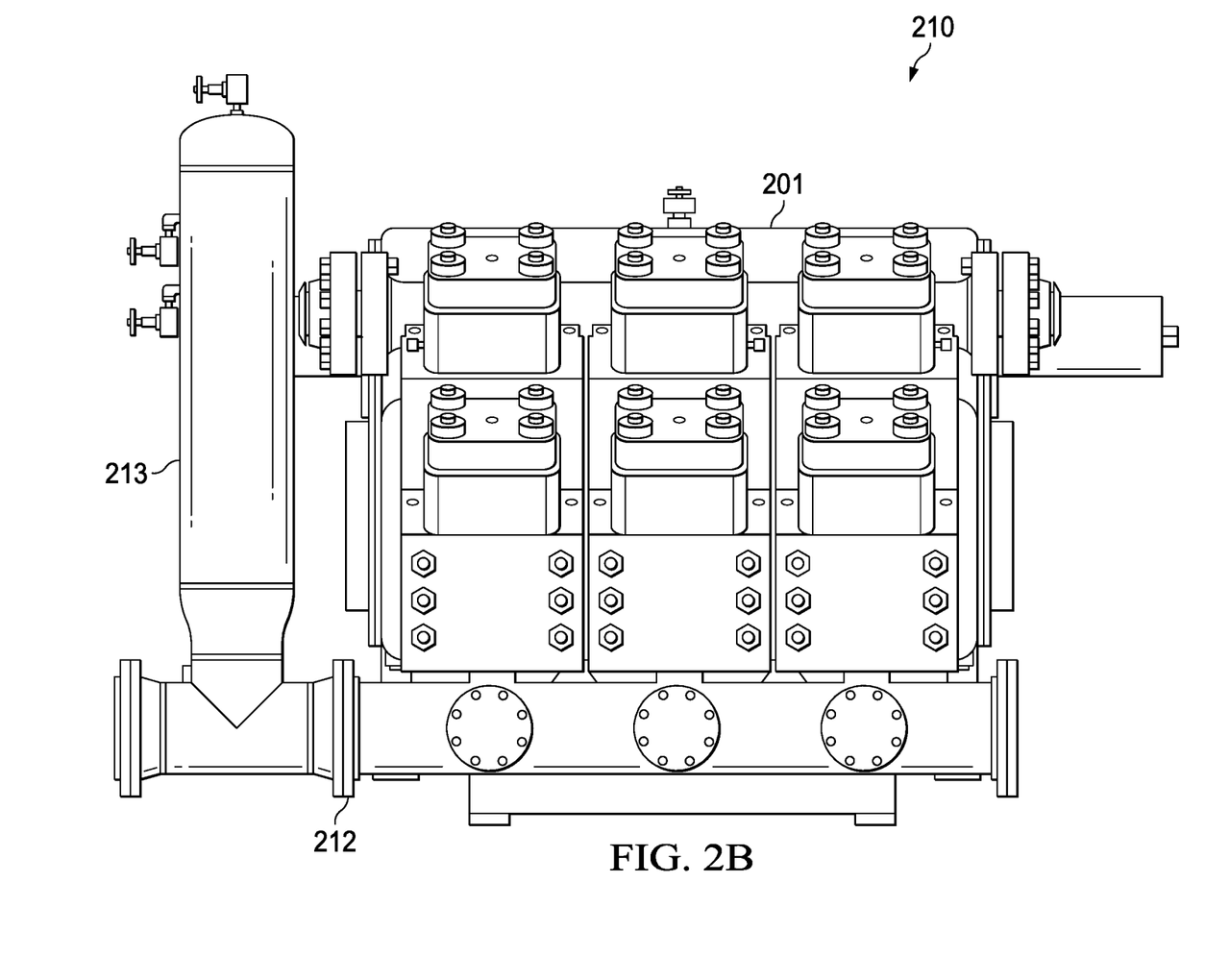

Conventional pump systems, such as the reciprocating pump system 100 shown in FIG. 1, typically include pulsation control products such as a discharge dampener, a suction stabilizer, or both. FIGS. 2A and 2B illustrate examples of location of a pulsation control suction stabilizer in relation to a pump according to various embodiments of the present disclosure. In particular, FIGS. 2A and 2B illustrate fluid delivery and pulsation dampening systems 200, 210 according to various embodiments of the present disclosure. FIGS. 2A and 2B illustrates location of a pulsation control suction stabilizer 203, 213 in relation to a pump 201 for flow-through and appendage-type suction stabilizers, respectively. Pump 201 is similar to the reciprocating pump system 100 of FIG. 1.

In general, suction stabilizers reduce the potential for a pump cylinder to cavitate due to difficulty taking in fluid, by increasing the fluid capacity of the pump's intake section. Suction stabilizers may also function as pulsation dampening devices by including (for example) a gas-charged bladder therein. However, in the embodiments described below, the suction stabilizers include a compressible or elastomeric foam cartridge to dampen pressure pulsations. Moreover, while the embodiments described below relate to a suction stabilizer pulsation dampening device coupled to the pump inlet, the cartridges described below may alternatively be used in a discharge dampener coupled to the pump outlet. FIGS. 2A and 2B depict alternative designs with corresponding features described collectively below for brevity.

In FIG. 2A and FIG. 2B, fluid enters the pump 201 at inlet 202, 212 and exits the pump at a discharge. Inlet 202, 212 is referred to as the suction end of the pump 201, as the fluid is sucked into the pump, from which fluid is discharged via the pump discharge or outlet to downstream components and equipment. Pulsation control suction stabilizer 203, 213 stabilizes fluid flow and dampens pressure pulsations within the fluid entering the pump 201. In the embodiments described, the pulsation control suction stabilizer 203, 213 is located at the inlet side of the pump, which is an effective location. Pulsation control suction stabilizer 203, 213 provides a steady flow of the fluid into the pump 201 and dampens fluid pressure pulsations prior with fluid entering the pump 201. Pulsation control suction stabilizer 203, 213 also reduces pulsation levels in the intake manifold and inside the pump.

Pulsation control suction stabilizer 203, 213 is sized based on the capacity of the respective pump 201, the fluid type (e.g., the amount of particular content, the fluid/gas ratio, and the like), the temperature of the fluid, the operating system pressure, the diameter of the plunger or piston of the pump 201, the stroke length of the pump 201 and the like.

FIGS. 3A-3D illustrate operation of an exemplary gas over liquid suction stabilizer to be retrofitted according to embodiments of the present disclosure. As noted above, pulsation control devices may use a simple gas over liquid design, a gas-charged bladder design, or a charge-free design. FIGS. 3A-3D illustrate suction stabilizer 203 in operations 300-303 for a gas over liquid design, although the same description is generally applicable to gas-charged bladder designs. The embodiment of the suction stabilizer 203 in operations 300-303 illustrated in FIGS. 3A-3D is for illustration only. FIGS. 3A-3D do not limit the scope of this disclosure to any particular implementation of a pulsation control dampener system.

Figure 3A:
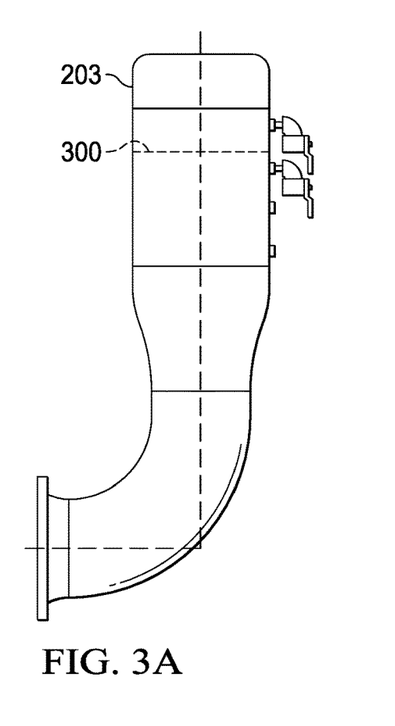
FIGS. 3A-3D illustrate operation of an exemplary gas-charged suction stabilizer to be retrofitted according to embodiments of the present disclosure.
Figure 3B:
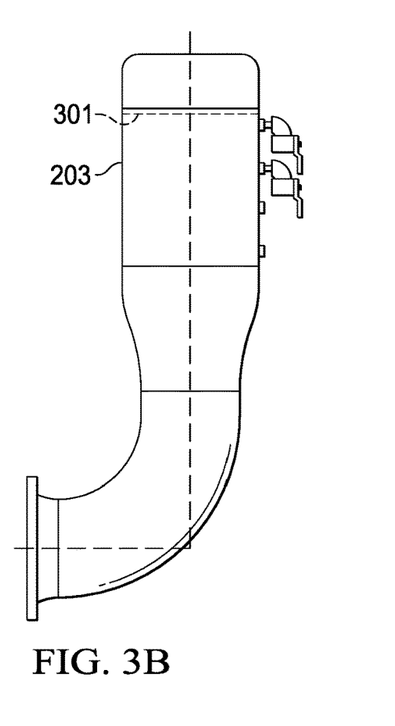

FIGS. 3A-3D illustrate a fill level 300, 301, 302 or 303 in suction stabilizer 203 at different operational points 303. The fill level 300 (sometimes referred to as "fluid level") indicates a general point of separation or transition within the suction stabilizer between the gas (above fill level 300) and fluid (below fill level 300). As shown in FIG. 3A, the suction stabilizer 203 is initially charged with gas, resulting in fill level 300. In the field, the amount of gas that is inserted into the suction stabilizer 203 is usually estimated, as there are generally no sensors or indicators to measure the fill level of the gas and the inclusion of such instruments may not provide enough added benefit for the cost. As shown in FIG. 3B, a fill level 301 increases after charging the suction stabilizer 203 and the pump is activated. Once the pump is activated, the amount of pressure in the fluid increases due to the pumping. In turn, the gas is condensed and the fill level raises inside the suction stabilizer 203.

Figure 3C:
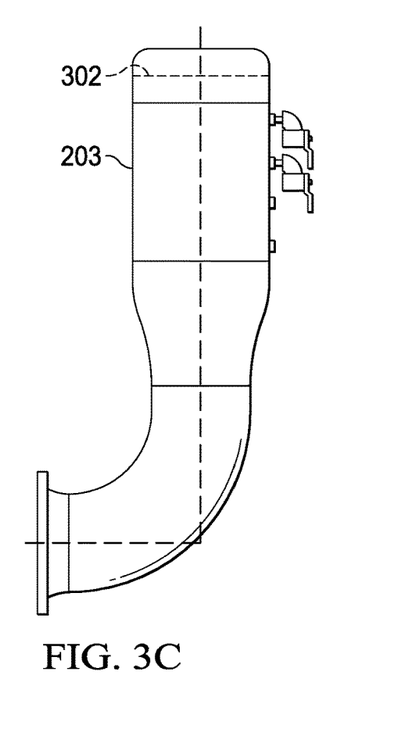
Figure 3D:
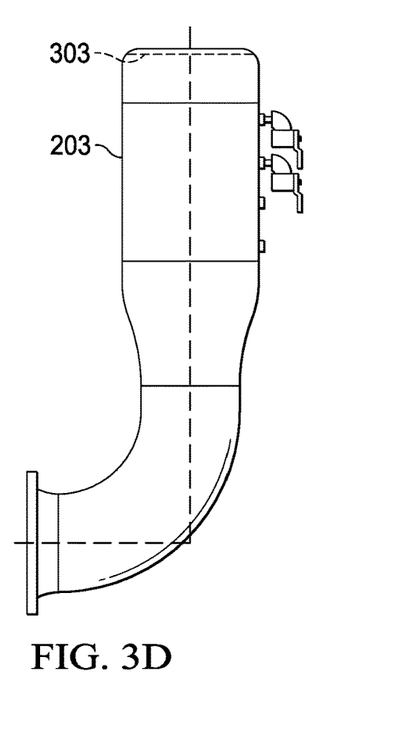

FIG. 3C illustrates a fill level 302 after the pump has run for a time that allows the gas to begin dissolving into the fluid. At a pressure dependent on the type of fluid, and over time, the gas begins to dissolve into or be absorbed by the fluid. The fill level continues to rise based on the gas gradually being depleted by dissolving into the liquid and being removed through the pumping process. FIG. 3D illustrates a fluid level 303 where the gas has been almost completely depleted. At this point the suction stabilizer does not provide significant added pulsation control unless recharged with additional gas. The operation points 300-303 of the suction stabilizer 203 illustrate a process that occurs over a relatively short period of time compared to the operation of the pump, as quickly as a few hours, requiring frequent charging to maintain the pulsation dampening benefits of the suction stabilizer 203. A similar process occurs in gas-charged bladder pulsation dampener devices, since the gas (e.g., nitrogen) permeates through the barrier (usually some form of rubber) between the gas and fluid due to pressure differentials, dissolves into the fluid, and is removed by the pumping action. Gas depletion is substantially more gradual in designs using a barrier between the gas and fluid, but still requires periodic recharging and therefore imposes a significant maintenance burden, particularly for pumps in remote locations.

Retrofitting suction stabilizer 203 with a gas filled cellular material allows for pulsation control higher operating pressures, since the gas filled cellular material will retain the gas at higher pressures and thereby significantly extend the useful life of the suction stabilizer before requiring maintenance. The use of gas filled cellular material could provide suction stabilizing benefits on the order of years, which is a significant increase over gas-charged bladder designs.

The pressures on the suction side of the pump can require a significant amount of gas filled cellular material to efficiently reduce pulsations. With the amount of gas filled cellular material required, multiple nested cellular cylinders can be used to enhance the efficiency of the suction stabilizer. Potentially, a single cellular object with an intricate design that keeps the thickness to a minimum could be used, but this option would require a very expensive manufacturing process to create. That is, the thickness of the gas filled cellular material used is limited based on a strength of the material encapsulating the gas, which must exceed or surpass the compression strength of the gas.

FIGS. 4A-4D illustrate various views of a gas charged pulsation control suction stabilizer 400 according to various embodiments of the present disclosure. FIGS. 4A-4D illustrate an appendage-type pulsation control suction stabilizer, although the same description is generally applicable to flow-through designs. The embodiment(s) of the gas charged pulsation control suction stabilizer 400 illustrated in FIGS. 4A-4D are for illustration only. FIGS. 4A-4D do not limit the scope of this disclosure to any particular implementation of a pulsation control dampener system.

Figure 4A:
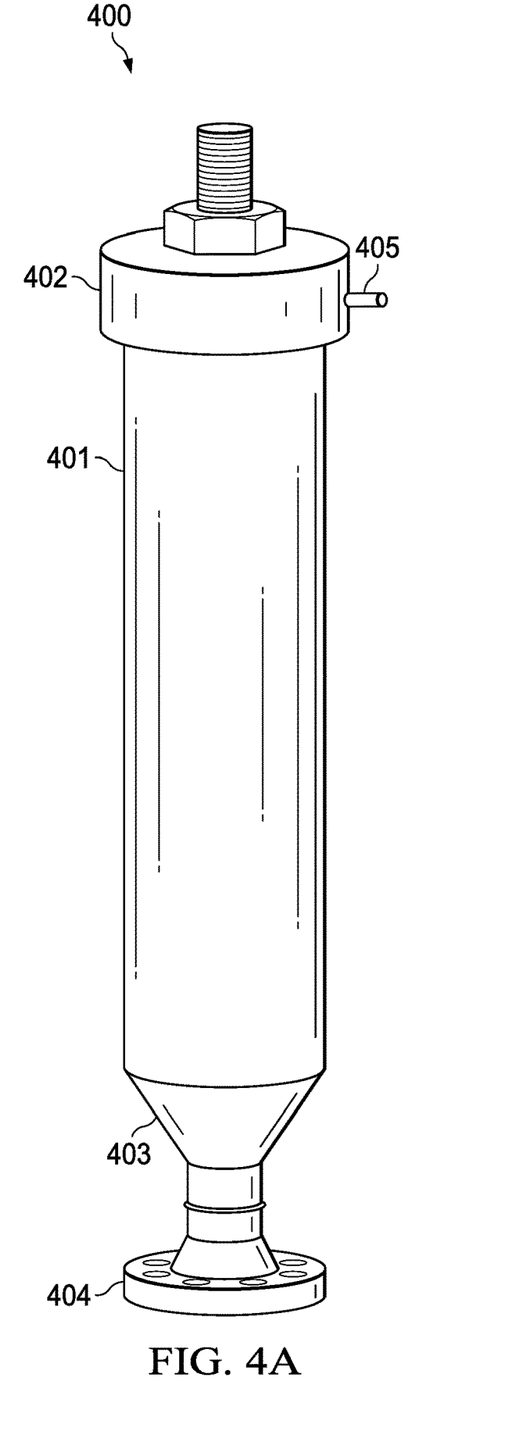
FIG. 4A illustrates an external view of a pulsation control suction stabilizer or dampener according to various embodiments of the present disclosure.

FIG. 4A illustrates a gas charged pulsation control suction stabilizer 400 designed or retrofitted for charge-free operation. Pulsation control suction stabilizer 400 is similar to the pulsation control suction stabilizers 203, 213 of FIG. 2. Pulsation control suction stabilizer 400 acts as an energy absorber of pressure pulsations within the pumped fluid. Pulsation control suction stabilizer 400 includes a cylinder 401, a top ring 402, a concentric reducer 403, a flange connection 404, and a bleeder valve 405. The cylinder 401 has a height and a width sized to contain a gas filled cartridge or, in case of retrofitting, of a size accepting the gas filled cartridge, and based on the operating conditions of the closed pumping system in either case. The top ring 402 is the connection for the gas filled cartridge. The flange connection 404 is the connection between the pulsation control suction stabilizer 400 and the pipe containing the fluid that is to be dampened. In certain embodiments, the flange connection 404 is threaded. The bleeder valve 405 provides a temporary opening into the closed system, allowing air or other substances to be removed from the system by way of pressure differences.

Figure 4B:
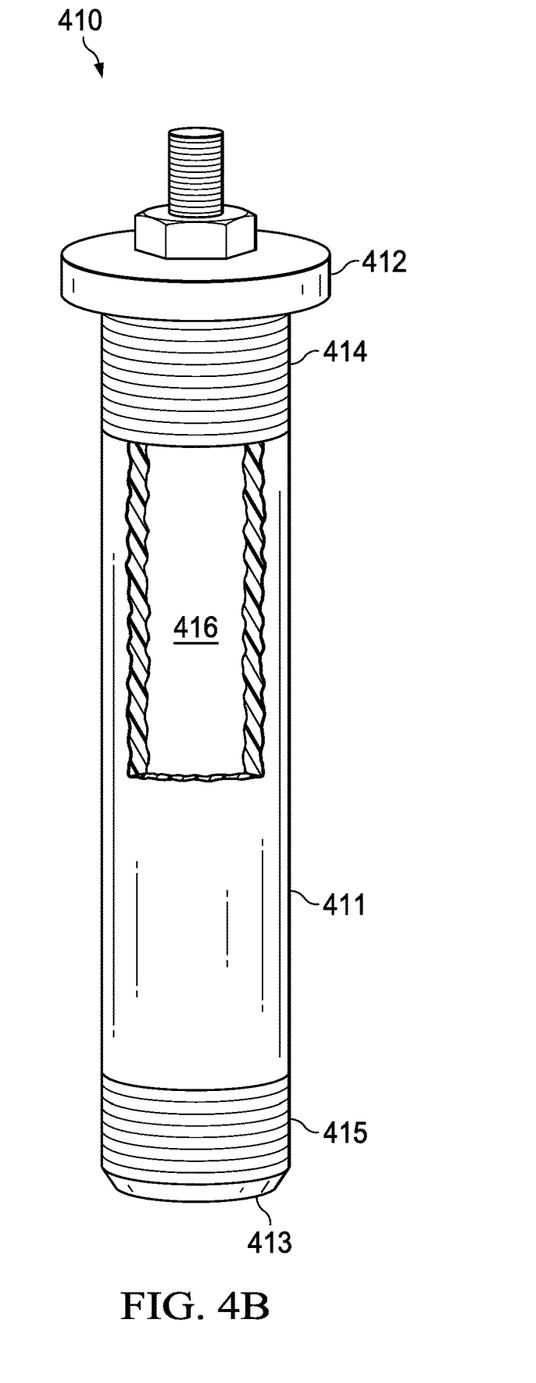
FIG. 4B illustrates an external view of a pulsation control suction stabilizer or dampener cartridge according to various embodiments of the present disclosure.

FIG. 4B illustrates an external view of a pulsation control suction stabilizer cartridge 410 according to various embodiments of the present disclosure. The embodiment of the pulsation control suction stabilizer cartridge 410 illustrated in FIG. 4B is for illustration only. FIG. 4B does not limit the scope of this disclosure to any particular implementation of a pulsation control dampener system. FIG. 4B illustrates a cartridge 410 performing the dampening of pressure variations in the fluid when installed in pulsation control suction stabilizer 400. Cartridge 410 includes an elastomer composite 411, an internal volume 416 of the elastomer composite 411, a head 412, a plug 413, and crimping sleeves 414 and 415. In certain embodiments, the head 412 and the plug 413 are metal. In certain embodiments, the head 412 and the plug 413 are bonded to the elastomer composite 411. In certain embodiments, the elastomer composite 411 is one or more layers of rubber or a similar material. In certain embodiments, the elastomer composite 411 includes at least one layer of closed-cell compressible foam in between layers of rubber or the like. In certain embodiments, the elastomer composite 411 is molded to the head 412 and the plug 413. In certain embodiments, the elastomer composite 411 includes cords to reinforce the elastomer composite 411 against both high internal pressures and high external pressures. Cartridge 410 is placed in the suction stabilizer 400 as shown in FIGS. 4C-4D, 5 and 6C below. In certain embodiments, the elastomer composite 411 is cured and bonded to the head 412 and the plug 413 using a mold. Thereafter, the elastomer composite 411, head 412 and the plug 413 are removed from the mold and a first sleeve 414 is slipped over and affixed by crimping to the elastomer composite 411 in proximity to the head 412, and a second sleeve 415 is slipped over and affixed by crimping to the to the elastomer composite 411 in proximity to the plug 413. The crimping of sleeves 414 and 415 create radially inward concentrated pressure locations that provide additional pressure forces to help secure the elastomer composite 411 to the head 412 and plug 413, respectively.

The pulsation control suction stabilizer 400 is open on the bottom of the flange connection 404, allowing fluid from the piping system to enter and exit an internal volume of the pulsation control suction stabilizer 400 in which the pulsation control suction stabilizer cartridge 410 is disposed. Pressure variations contained within the pumped fluid also affect fluid within the internal volume of the pulsation control suction stabilizer 400 and are dampened by the cartridge 410. The head 412 of the cartridge 410 is affixed to the top ring 402 of the pulsation control suction stabilizer 400. Therefore, the head 412 is fixed and cannot move while the closed pumping system is operating. The plug 413 is connected to the head 412 via bonding of the elastomer composite 411 to both head 412 and plug 413. The attachment of head 412 to the elastomer composite 411 by bonding is enhanced by crimping sleeve 414, which applies pressure forces onto elastomer composite 411 and head 412. Similarly, the attachment of plug 413 to elastomer composite 411 by bonding is further enhanced by crimping sleeve 415. In addition to gas within closed cells of the elastomer material (if including compressible foam rather than just rubber or the like), the elastomer composite 411 is filled with gas. The internal pressure of the gas within the elastomer composite 411 is a pre-charge pressure. In certain embodiments, the gas is nitrogen. The elastomer composite 411 is sealed by the head 412 and the plug 413 to create an airtight cylinder. The seal is enhanced by the crimping bands.

In certain embodiments, when the elastomer composite 411 is filled with a gas, also called pre-charging, the internal pre-charge pressure can range from 100 pounds per square inch (PSI) to 500 PSI. The internal pre-charge pressure of the cartridge 410 is selected to match the operating output pressure from a pump. For example, if the pressure of the fluid in the pipeline is at 2,500 PSI, then the cartridge 410 within the pulsation control suction stabilizer 400 could be pre-charged to a corresponding pressure, such as 500 PSI, to reduce both high and low frequency pressure pulsations. To a certain extent, the smaller the difference between the pressure of the fluid in the pipeline and the internal pressure of the cartridge 410, the more efficient the cartridge 410 is at dampening pressure variations. Similarly (and to a similar extent), the larger the difference between the pressure of the fluid in the pipeline and the internal pressure of the cartridge 410, the poorer the cartridge 410 is at dampening pressure pulsations. Also, when the internal pressure of the cartridge 410 is larger than the pressure of the fluid in the pipeline, minimal pressure dampening is accomplished.

When the elastomer composite 411 is presented with a pressure variation, the gas within the cartridge compresses or expands to increase or reduce fluid volume within the internal volume of the pulsation control suction stabilizer 400, effectively reducing pressure variations of the fluid. By the gas expanding and compressing, the circumference of the elastomer composite 411 can increase and decrease, thereby causing the length of the elastomer composite 411 to expand or contract and the plug 413 to move up and down the length of the cylinder 401 of the pulsation control suction stabilizer 400.

The elastomer composite 411 is under large hoop stress and axial stress loads due to the frequent expansion and compression caused by pressure variations in the fluid. Hoop stress is a stress that is tangential to the longitudinal direction of the elastomer composite 411. The hoop stress is the force exerted circumferentially, perpendicular both to the axis and to the radius of the object, in both directions on every particle in the cylinder wall of the elastomer composite 411. For example, any force applied to the cylindrical walls of the elastomer composite 411 by the internal pressure of the gas, as well as the external pressure of the fluid, creates hoop stress.

Axial stress is a stress that is parallel to the axis of the cylinder. Axial stress is also at the location where the elastomer composite 411 is bonded to the head 412 and the plug 413. Any force applied to the head 412 or the plug 413 by a static pressure induces the axial stress on the elastomer composite 411.

The cartridge 410 often fails after a period of time due to the frequent expansion and compression caused by pressure variations in the fluid, as well as the hoop stress and axial stress loads, endured by the elastomer composite 411, the head 412, and the plug 413. For example, the elastomer composite 411 can burst due to the hoop stress. In another example, a leak can form between the elastomer composite 411 and the plug 413. As the plug 413 moves up and down, and as the elastomer composite 411 expands and compresses due to pressure variations, the bond between the plug 413 and the elastomer composite 411 can start to fail. Small holes or cracks are formed between the plug 413 and the elastomer composite 411, allowing the pre-charged gas to escape. The internal pressure of the cartridge 410 decreases as the gas escapes the cartridge, thereby decreasing the effectiveness of the cartridge 410 from reducing pressure pulsations within the fluid. In another example, the inside wall of the elastomer composite 411 can start to crack. If a cord of the elastomer composite 411 breaks free, the cord can cause an internal puncture of the homogenous rubber of the internal sleeve of the elastomer composite 411. The pre-charged gas can then escape the cartridge through the puncture. The internal pressure of the cartridge 410 decreases as the gas to escapes the cartridge.

Figure 4C:
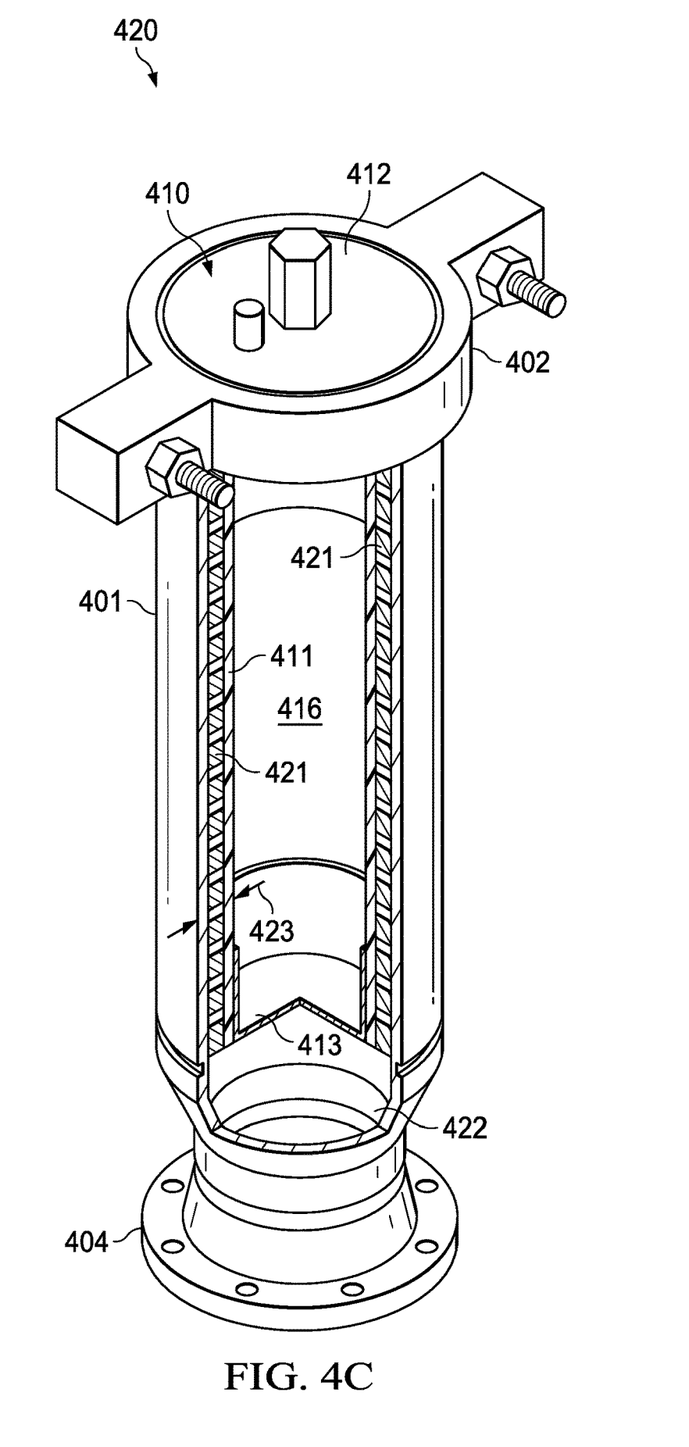
FIG. 4C illustrates a partially cut away view of a pulsation control suction stabilizer or dampener according to various embodiments of the present disclosure.

FIG. 4C illustrates a partially cut away view of a pulsation control suction stabilizer assembly 420 according to various embodiments of the present disclosure. The embodiment of the pulsation control suction stabilizer assembly 420 illustrated in FIG. 4C is for illustration only.

FIG. 4C does not limit the scope of this disclosure to any particular implementation of a pulsation control dampener system.

FIG. 4C illustrates a pulsation control suction stabilizer assembly 420. Pulsation control suction stabilizer assembly 420 is similar to the pulsation control suction stabilizer 400 of FIG. 4A and the pulsation control suction stabilizers 203, 213 of FIGS. 2A and 2B. Pulsation control suction stabilizer 420 includes a cylinder 401 (similar to the cylinder 401 of FIG. 4A), a top ring 402 (similar to the top ring 402 of FIG. 4A), a flange connection 404 (similar to the flange connection 404 of FIG. 4A), and a cartridge 410 (similar to the pulsation control suction stabilizer cartridge 410 of FIG. 4B). The cartridge 410 includes an elastomer composite 411 (similar to the elastomer composite 411 of FIG. 4B) with an internal volume 416 (similar to the internal volume 416 of FIG. 4B), a head 412 (similar to the head 412 of FIG. 4B), a plug 413 (similar to the plug 413 of FIG. 4B), a perforated retaining sleeve 421 and an opening 422 to the fluid within the piping system, and an annulus 423.

The cartridge 420 includes the elastomer composite 411, the head 412, the plug 413, similar to cartridge 410 of FIG. 4B, and also includes a perforated retaining sleeve 421 that inhibits longitudinal contraction of the elastomer composite. In certain embodiments, the cartridge 420 also includes crimping sleeves 414 and 415, in similar locations as discussed with respect to FIG. 4B. The cartridge 420 is inserted inside the cylinder 401 and sealed to prevent the escape of the fluid from the piping system. In certain embodiments, the top ring 402 and the head 412 fit to form a flush surface.

Pulsation control suction stabilizer 420 sits on a pipe in a piping system (preferably near the pump inlet or intake as shown in FIG. 2B) and is connected at the flange connection 404. The fluid enters the pulsation control stabilizer 420 through opening 422. The fluid may then travel upwards and downwards inside the cylinder 401 under influence of pressure variations in the pumped fluid. The annulus 423 is the area between the cartridge 410 and the inner circumference of the cylinder 401. The annulus 423 is an area that allows the fluid to travel inside the cylinder 401 and through the perforated retaining sleeve 421. The fluid traveling inside the cylinder 401 and outside the cartridge 410 transmits pressure pulsations to the elastomer composite 411. The elastomer composite 411 compresses and expands as the pressure created by the pulsations from the pump is absorbed and exuded. The elastomer composite 411 absorbing the pressure pulsations causes the pressure pulsations within the fluid to be dampened.

Figure 4D:
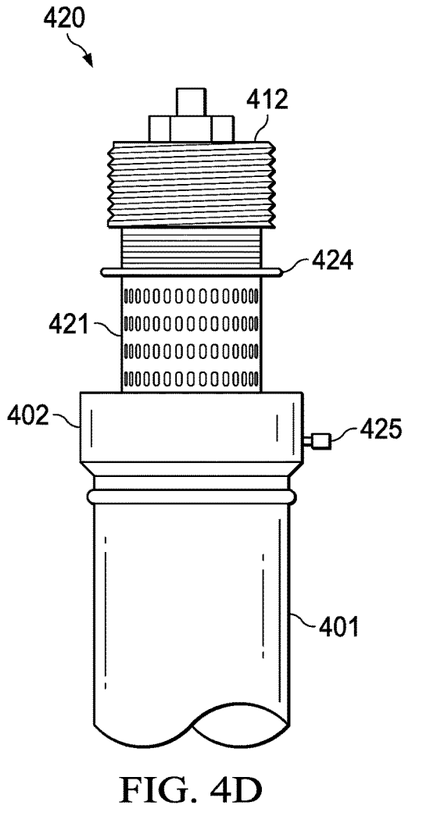
FIG. 4D illustrates a partially exploded view of a pulsation control suction stabilizer or dampener according to various embodiments of the present disclosure.

FIG. 4D illustrates a partially exploded view of a pulsation control stabilizer assembly 420 according to various embodiments of the present disclosure. The embodiment of the pulsation control suction stabilizer assembly 420 illustrated in FIG. 4D is for illustration only. FIG. 4D does not limit the scope of this disclosure to any particular implementation of a pulsation control dampener system.

The pulsation control suction stabilizer assembly 420 of FIG. 4D includes a cylinder 401 (similar to the cylinder 401 of FIG. 4A and the cylinder 401 of FIG. 4C), a top ring 402 (similar to the top ring 402 of FIG. 4A and top ring 402 of FIG. 4C), a head 412 (similar to the head 412 of FIG. 4B, and the head 412 of FIG. 4C), a perforated retaining sleeve 421 (similar to the perforated retaining sleeve 421 of FIG. 4C), a bleeder valve 425 (similar to the bleeder valve 405 of FIG. 4A), and an O-ring 424.

The O-ring 424 acts as a mechanical gasket between the head 412 and the cylinder 401. The head 412 is threaded and is inserted into the top ring 402 (which is correspondingly threaded). In certain embodiments, the top ring 402 includes a screw clamp that locks the head 412 in place.

Figure 5:
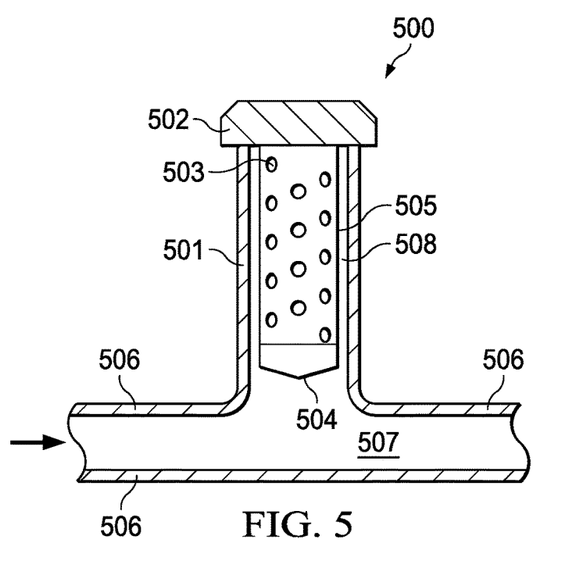
FIG. 5 illustrates a partial cross sectional diagrammatic view of a fluid delivery and pulsation dampening system according to various embodiments of the present disclosure.

FIG. 5 illustrates a partial cross sectional diagrammatic view of a fluid delivery and pulsation dampening system 500 according to various embodiments of the present disclosure. The embodiment of the fluid delivery and pulsation dampening system 500 illustrated in FIG. 5 is for illustration only. FIG. 5 does not limit the scope of this disclosure to any particular implementation of a pulsation control dampener system.

FIG. 5 illustrates a pipe 506 containing fluid 507 and a pulsation control suction stabilizer or dampener 501. The pulsation control suction stabilizer or dampener 501 includes a top ring 502 (similar to the top ring 402 of FIG. 4A, the top ring 402 of FIG. 4C, and the top ring 402 of FIG. 4D), a plug 504 (similar to the plug 413 of FIG. 4B, and the plug 413 of FIG. 4C), a perforated retaining sleeve 505 (similar to the perforated retaining sleeve 421 of FIG. 4C, and the perforated retaining sleeve 421 of FIG. 4D), an elastomer composite 503 (similar to the elastomer composite 411 of FIG. 4B, and 411 of FIG. 4C), and an annulus 508 (similar to the annulus 423 of FIG. 4C).

The pipe 506 and the annulus 508 are filled with the fluid 507. The fluid 507 moves through pipe 506 and the annulus 508, and contains pressure variations. The elastomer composite 503 compresses and expands as the pressure variations within the fluid 507 are dampened. The perforated retaining sleeve 505 provides structure and support to the elastomer composite 503, while the elastomer composite 503 is still able to dampen pressure variations within the fluid. FIGS. 6A-6E illustrate an exemplary suction stabilizer or dampener including dual-nested dampener cartridges 600 or triple-nested dampener cartridges 620 inside suction stabilizer or dampener 610 according to various embodiments of the present disclosure. The embodiments of the suction stabilizer or dampener 610 of the cartridges 600, 620 therein that are illustrated by FIGS. 6A-6E are for illustration only. FIGS. 6A-6E do not limit the scope of this disclosure to any particular implementation of a pulsation control dampener system.

Figure 6A:
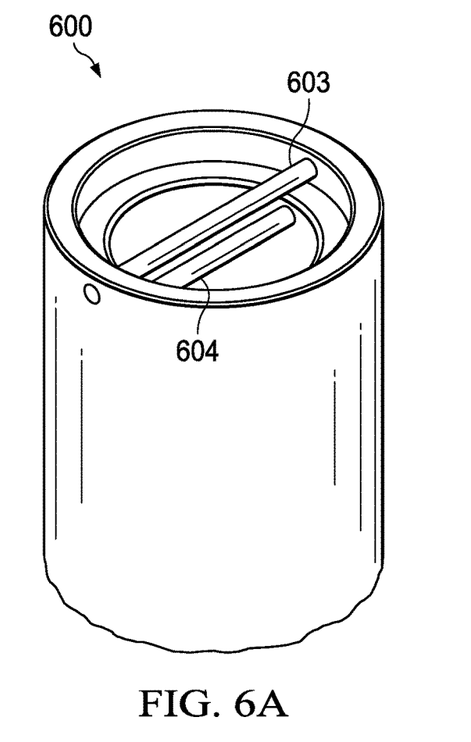
FIGS. 6A-6B illustrate an exemplary multi-layered (dual-nested) dampener cartridge according to various embodiments of the present disclosure.
Figure 6B:
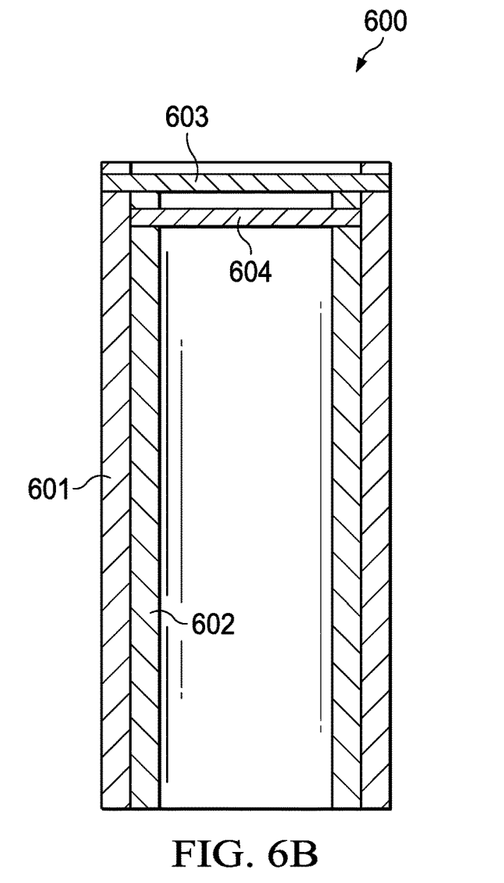
Figure 6C:
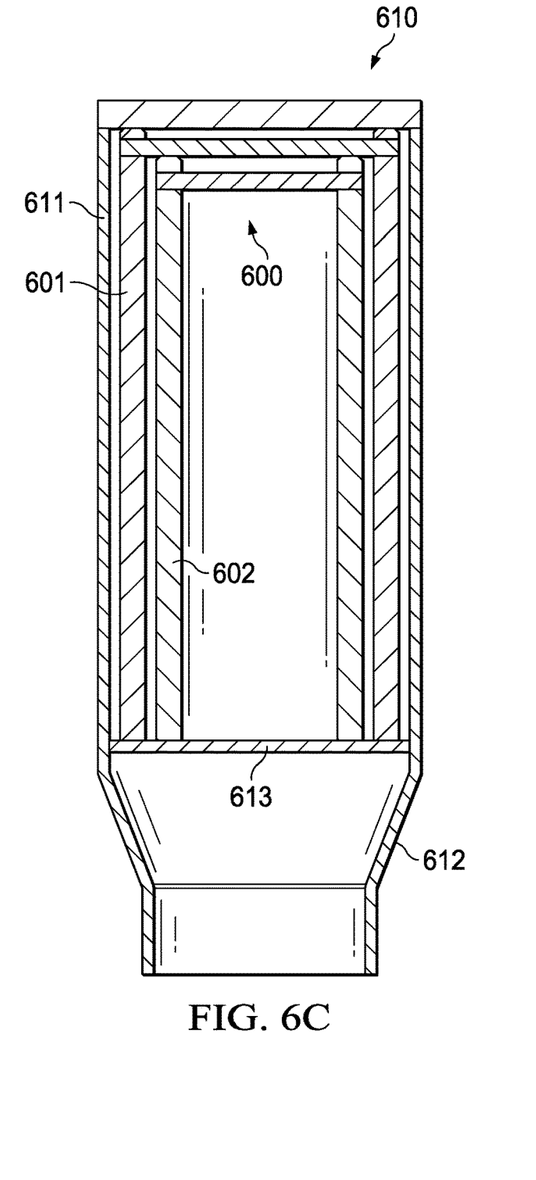
FIG. 6C illustrates an example of a multi-layered nested cartridge within a dampener cylinder according to embodiments of the present disclosure.
Figure 6D:
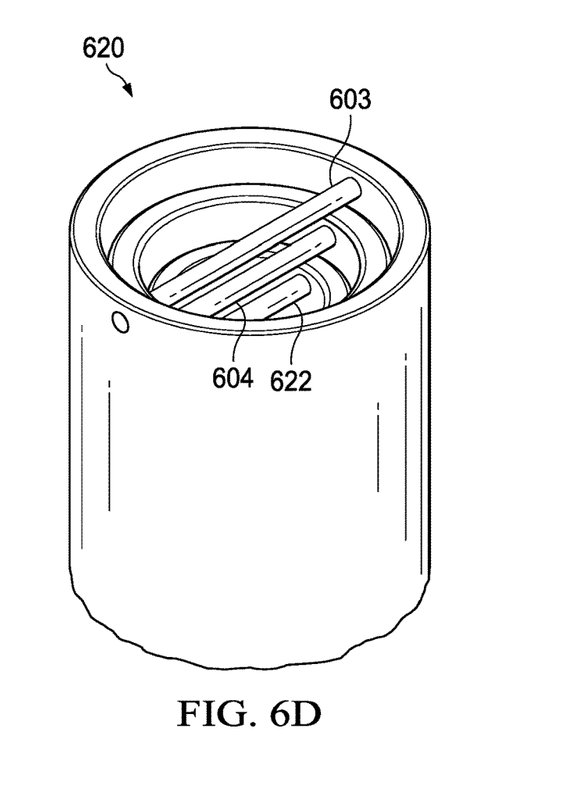
FIGS. 6D-6E illustrate an exemplary multi-layered (triple-nested) dampener cartridge according to various embodiments of the present disclosure.
Figure 6E:
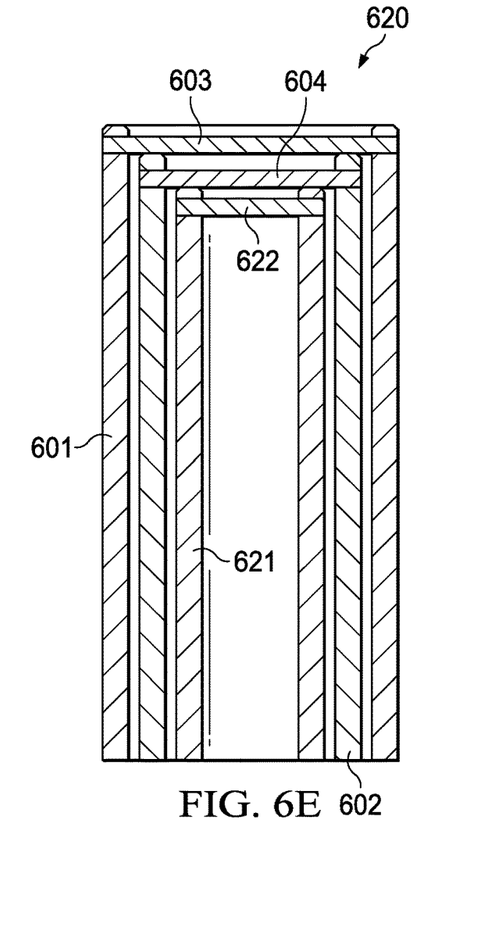

FIG. 6A illustrates exemplary dual nested dampener cartridges 600 from a top perspective view, while FIG. 6B illustrates exemplary dual nested dampener cartridges 600 in cross section, according to embodiments of the present disclosure. FIG. 6C illustrates multi-layered nested cartridge within a dampener cylinder according to embodiments of the present disclosure. FIGS. 6D-6E illustrate an exemplary multi-layered (triple-nested) dampener cartridge according to various embodiments of the present disclosure. FIG. 6D illustrates exemplary triple nested dampener cartridges 620 from a top perspective view, while FIG. 6E illustrates exemplary triple nested dampener cartridges 620 in cross section, according to embodiments of the present disclosure. While the embodiments in FIGS. 6A-6E illustrate dual-nested and triple-nested cartridges, any number of cartridges could be nested inside each other.

As illustrated in FIGS. 6A-6C, the suction stabilizer or dampener 610 may include nested dampener cartridges 601, 602 inside a cylinder 611. The nested dampener cartridges 601, 602 can be made of a plurality of cartridges of different sizes. For example, the nested dampener cartridges can include a first cartridge 601 and a second cartridge 602. In certain embodiments, each of the dampener cartridges 601, 602 may be formed of an elastomer composite including rubber or the like encasing a closed-cell elastomeric foam as described above. In certain embodiments, each of the dampener cartridges 601, 602 may be annular structures in which the rubber walls of the annulus are gas-filled.

The dual nested dampener cartridges 600 include a first cartridge 601 and a second cartridge 602. The first cartridge 601 has a larger diameter than the second cartridge 602. The first cartridge 601 is also longer than the second cartridge 602. The extra length of the first cartridge is due to the clearance of the handle 603 (first handle) of the first cartridge 601 for easy clearance and removal of the first cartridge 601. The first cartridge 601 may be inserted into the cylinder 611 after the second cartridge 602, and removed before the second cartridge 602. The second cartridge 602 also includes a handle 604 (second handle) for easy insertion and removal.

Each of the nested dampener cartridges 601, 602 is structured as a hollow cylinder with the interior exposed at the top and bottom. The first cartridge 601 and the second cartridge 602 are structures with different radiuses, with the first cartridge 601 having a greater inner diameter than the external diameter of the second cartridge 602. The diameter of the first cartridge 601 is large enough so that the second cartridge 602 can fit inside the interior of the first cartridge 601. The dual nested dampener cartridges allow for greater pulsation dampening of the system than a single cartridge with a similar thickness to the cumulative thickness of the dual nested dampener cartridges. As the thickness of a cartridge increases, the pulsation dampening benefits of the dampener cartridge first increases to a point, but then begins decreasing when thickness of the rubber begins to overtake the density of the gas trapped inside the rubber. That is, the structural rigidity provided by the rubber thickness inhibits compressibility and recovery of the cartridge shape. Therefore, the dual nested dampener cartridges 600 provides the extended pressure pulsation benefit at higher operating pressures desired by the greater thickness of a single cartridge. Another added benefit of the dual nested dampener cartridges 600 is that the varying thicknesses allows (for open designs) fluid to enter between adjacent cartridges, such as between the first cartridge 601 and the second cartridge 602, as well as on the interior of the inner most cartridge and the exterior of the outermost cartridge. The dual nested dampener cartridges can also be structured with different thickness to accommodate different levels of pulsations. That is, the outermost cartridge can dampen small magnitude pressure pulses while the innermost cartridge dampens much larger (an order of magnitude or more) pressure pulses.

The cylindrical bodies for the first cartridge 601 and the second cartridge 602 can each include a cross support 613. The dual nested dampener cartridges can be inserted in any manner such as being dropped in, hung from the head, etc. When the dual nested dampener cartridges are dropped in, the cartridges can drop to the bottom of the cylinder 611 until they rest on the cylinder neck 612. In this position, solid particulates that are in the fluid can be trapped on the exterior of the dual nested dampener cartridges 600, accumulating a harmful buildup of solids. In order to accommodate the flow path of the cylinder 611, cross support 613 can be installed to support the first cartridge 601 and the second cartridge 602 and keep the dual nested dampener cartridges 600 separate from the neck 612 of the cylinder 611. The cross support 613 can be a bar attached to opposite sides of the cylinder as shown, or alternatively a mesh grill, a partial protrusion, etc.

Each of the dual nested dampener cartridges 600 includes handles 603, 604, which may be used to install and remove each nested cartridge individually. The handles are located at a specific position so as to not interfere with each other or with the other cartridges.

In other embodiments, where a cross support 613 is not used, a fluid relief pattern can be created or removed from the bottom of each of the dual nested dampener cartridges 600. The fluid relief pattern can allow any solids resting on the neck 612 of the cylinder 611 to find a way around the exterior of the dual nested dampener cartridges 600 and to flow freely.

Similar to the dual nested dampener cartridges 600, the triple-nested cartridges 620 include a first cartridge 601 and a second cartridge 602, and also includes a third cartridge 621. The first cartridge 601 and the second cartridge 602 are structured and function similarly to the cartridges in the dual nested dampener cartridges 600, but the triple nested cartridges 620 include a third cartridge 621 inside the second cartridge 602. That is, the third cartridge 621 has a smaller diameter than the second cartridge 602, with an outer diameter smaller than the inner diameter of the second cartridge 602. The length of the third cartridge 621 is also less than the length of the second cartridge 602 to allow the room for the second handle 604. The third cartridge 621 also includes a handle 622 (third handle). In certain embodiments, the handles 603, 604 and 622 can be pins that run through a center of the respective cartridge 601, 602, and 621.

Figure 7:
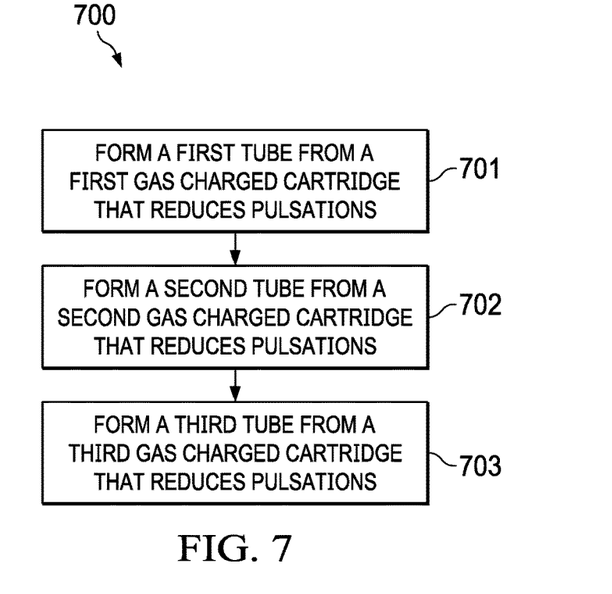
FIG. 7 illustrates a high level flow diagram for an exemplary method for forming multi-layered nested cartridges according to embodiments of the present disclosure.

FIG. 7 illustrates an exemplary method 700 for forming a multi-layered nested cartridge according to embodiments of the present disclosure. For ease of explanation, the method 700 shown in FIG. 7 is described as involving the forming the triple nested cartridge 610 of FIGS. 6C and 6D. However, the method 700 shown in FIG. 7 could be used with any other suitable device and in any other suitable system.

As shown in FIG. 7, a first tube is formed from a first gas charged cartridge that reduces pulsations in step 702. A cross section for the tubes can have any shape with a hollow center, including a circular cross section, a square cross section, a rectangular cross-section, etc. The first tube includes a first handle that is located on an interior or hollow portion of the first tube and connects at least two point of an internal surface of the first tube.

A second tube is formed from a second gas charged cartridge that reduces pulsations in step 704. The second tube includes a second handle that is located on an interior or hollow portion of the second tube and connects at least two point of an internal surface of the second tube. The first tube can be inserted around an exterior of the second tube. The handle of the first gas charged cartridge contacts a top of the second tube when the first tube is inserted around the exterior of the second tube A length of the second tube is less than a length of the first tube to accommodate the handle in a manner that a bottom end of the first tube and a bottom end of the second tube are aligned.

A third tube is formed from a third gas charged cartridge that reduces pulsations in step 706. The third tube includes a third handle that is located on an interior or hollow portion of the third tube and connects at least two point of an internal surface of the third tube. The second tube can be inserted around an exterior of the third tube. The handle of the second gas charged cartridge contacts a top of the third tube when the second tube is inserted around the exterior of the third tube A length of the third tube is less than a length of the second tube to accommodate the handle in a manner that a bottom end of the second tube and a bottom end of the third tube are aligned Although FIG. 7 illustrates one example of a method 700 for forming a multi-layered nested cartridge, various changes may be made to FIG. 7. For example, while shown as a series of steps, various steps in FIG. 7 may overlap, occur in parallel, occur in a different order, or occur any number of times.

Although the figures illustrate different examples of user equipment, various changes may be made to the figures. For example, the pulsation control stabilizer can include any number of each component in any suitable arrangement. In general, the figures do not limit the scope of this disclosure to any particular configuration(s). Moreover, while figures illustrate operational environments in which various pulsation control stabilizer features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A nested gas charged cartridge for insertion in a cylinder to reduce pulsations in a system, comprising:
   a first gas charged cartridge configured to reduce pulsations and formed into a first tube, wherein the first gas charged cartridge includes a handle that is a bar extending across an interior space of the first tube; and
   a second gas charged cartridge configured to reduce pulsations and formed into a second tube, wherein the first tube is inserted around an exterior of the second tube.

2. The nested gas charged cartridge of claim 1, wherein the of the first gas charged cartridge contacts a top of the second tube when the first tube is inserted around the exterior of the second tube.

3. The nested gas charged cartridge of claim 2, wherein a length of the second tube is less than a length of the first tube to accommodate the handle in a manner that a bottom end of the first tube and a bottom end of the second tube are aligned.

4. The nested gas charged cartridge of claim 1, further comprising a third gas charged cartridge configured to reduce pulsations and formed into a third tube, wherein the second tube is inserted around the third tube.

5. The nested gas charged cartridge of claim 4, wherein the second gas charged cartridge includes a handle that extends between two points with an interior of the second tube.

6. The nested gas charged cartridge of claim 5, wherein:
   the handle of the second gas charged cartridge contacts a top of the third tube when the second tube is inserted around the exterior of the third tube, and
   a length of the third tube is less than a length of the second tube to accommodate the handle in a manner that a bottom end of the second tube and a bottom end of the third tube are aligned.

7. A pulsation control stabilizer for reducing pulsation in a system, the pulsation control stabilizer comprising:
   a cylinder; and
   a nested gas charged cartridge inserted into the cylinder to reduce pulsations, the nested gas charged cartridge includes:
      a first gas charged cartridge configured to reduce pulsations and formed into a first tube, wherein the first gas charged cartridge includes a handle that is a bar extending across an interior space of the first tube, and a second gas charged cartridge configured to reduce pulsations and formed into a second tube, wherein the first tube is inserted around an exterior of the second tube.

8. The pulsation control stabilizer of claim 7, wherein the of the first gas charged cartridge contacts a top of the second tube when the first tube is inserted around the exterior of the second tube.

9. The pulsation control stabilizer of claim 8, wherein
a length of the second tube is less than a length of the first tube to accommodate the handle in a manner that a bottom end of the first tube and a bottom end of the second tube are aligned.

10. The pulsation control stabilizer of claim 7, further comprising a third gas charged cartridge configured to reduce pulsations and formed into a third tube, wherein the second tube is inserted around the third tube.

11. The pulsation control stabilizer of claim 10, wherein the second gas charged cartridge includes a handle that extends between two points with an interior of the second tube.

12. The pulsation control stabilizer of claim 11, wherein:
the handle of the second gas charged cartridge contacts a top of the third tube when the second tube is inserted around the exterior of the third tube, and
a length of the third tube is less than a length of the second tube to accommodate the handle in a manner that a bottom end of the second tube and a bottom end of the third tube are aligned.

13. The pulsation control stabilizer of claim 7, wherein the cylinder includes a cross support to support the nested gas charged cartridge.

14. The pulsation control stabilizer of claim 13, wherein the cross support is one of a bar attached to opposite sides of the cylinder, a mesh grill, and a partial protrusion from a side wall of the cylinder.

15. A method for a nested gas charged cartridge for insertion in a cylinder to reduce pulsations in a system, comprising:
forming a first gas charged cartridge that reduces pulsations into a first tube, wherein the first gas charged cartridge includes a handle that is a bar extending across an interior space of the first tube; and
forming a second gas charged cartridge that reduces pulsations into a second tube, wherein the first tube is inserted around an exterior of the second tube.

16. The method of claim 15, wherein the handle of the first gas charged cartridge contacts a top of the second tube when the first tube is inserted around the exterior of the second tube.

17. The method of claim 16, wherein
a length of the second tube is less than a length of the first tube to accommodate the handle in a manner that a bottom end of the first tube and a bottom end of the second tube are aligned.

18. The method of claim 15, further comprising forming a third gas charged cartridge that reduces pulsations into a third tube, wherein the second tube is inserted around the third tube.

19. The method of claim 18, wherein the second gas charged cartridge includes a handle that extends between two points with an interior of the second tube.

20. The method of claim 19, wherein:
the handle of the second gas charged cartridge contacts a top of the third tube when the second tube is inserted around the exterior of the third tube, and
a length of the third tube is less than a length of the second tube to accommodate the handle in a manner that a bottom end of the second tube and a bottom end of the third tube are aligned.

* * * * *